United States Patent [19]

Belanger

[11] 4,057,866

[45] Nov. 15, 1977

[54] APPARATUS FOR WASHING AND DRYING MOTOR VEHICLES

[75] Inventor: James A. Belanger, Northville, Mich.

[73] Assignee: Belanger, Inc., Northville, Mich.

[21] Appl. No.: 728,824

[22] Filed: Oct. 1, 1976

[51] Int. Cl.$^2$ .............................................. B60S 3/04
[52] U.S. Cl. .................................. 15/97 B; 15/DIG. 2
[58] Field of Search ................... 15/DIG. 2, 97 B, 77; 51/119, 65, 68, 334

[56] References Cited

U.S. PATENT DOCUMENTS

| | | | |
|---|---|---|---|
| 2,179,831 | 11/1939 | Sedgwick | 15/77 X |
| 3,499,180 | 3/1970 | Hurwitz | 15/97 B |
| 3,711,883 | 1/1973 | Ennis | 15/97 B |
| 3,825,969 | 7/1974 | Welter | 15/97 B |
| 3,859,686 | 1/1975 | Breish | 15/97 B |

*Primary Examiner*—Edward L. Roberts
*Attorney, Agent, or Firm*—Cullen, Settle, Sloman & Cantor

[57] ABSTRACT

Apparatus is provided for automatically performing an operation such as washing, drying, buffing, polishing, finishing or the like on a motor vehicle as it is transported through a frame having an entrance, an exit, and an intermediate portion vertically spaced above the vehicle between the entrance and the exit. A support member extends across the intermediate portion of the frame and pivotally supports a pair of arms about a central portion thereof. One end of each of the arms pivotally supports a first rack on one side of the support while the opposite end of each of the arms pivotally supports a second rack on the opposite side of the support. Each of the racks has one or more pack units of finishing material suspended therefrom for washing, drying, buffing, polishing or otherwise finishing the motor vehicle. A rotating element is driven by a motor. A linkage member has one end pivotally connected to the rotating element and its opposite end pivotally connected to a portion of one of the arms at a point spaced from the central portion thereof such that the rotation of the element results in a generally arcuate back and forth motion of the racks in a horizontal plane to facilitate the operation being performed on the motor vehicle.

14 Claims, 4 Drawing Figures

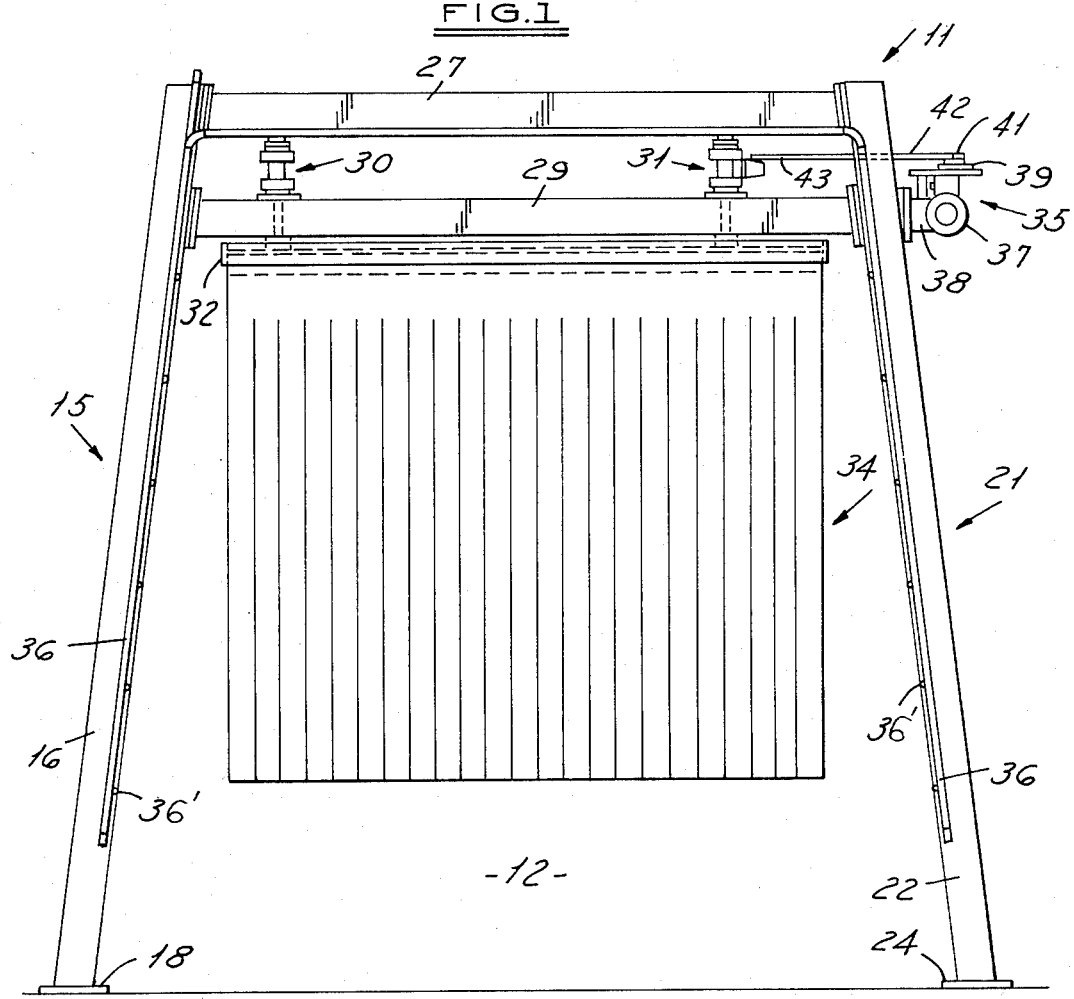
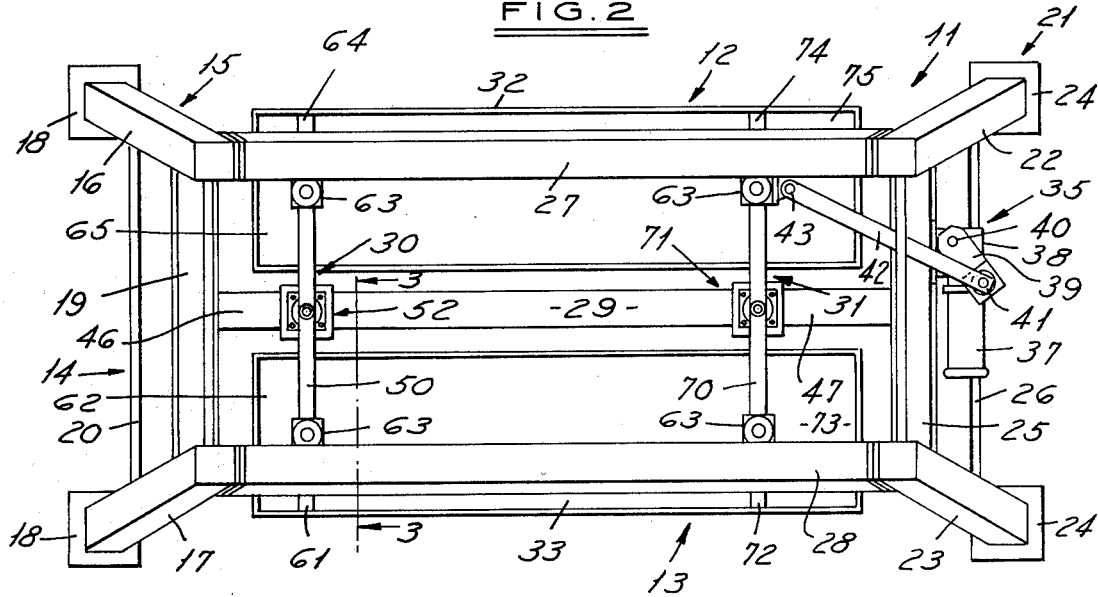

APPARATUS FOR WASHING AND DRYING MOTOR VEHICLES

BACKGROUND OF THE INVENTION

1. Field of the Invention

The present invention relates to an improved apparatus for washing, drying, buffing, polishing or otherwise finishing a motor vehicle as it is transported therethrough and more particularly to such an apparatus for automatically performing the desired operation by moving one or more pack units of finishing material in frictional contact with the motor vehicle.

In the preferred embodiment of this invention, the apparatus is adapted to be employed in commercial automotive car washing establishments and may be used for washing and/or drying the automobile as it passes under and through the rack. As the motor vehicle passes under the rack, pack units of suitable finishing material are moved with respect to the motor vehicle for frictionally engaging same and effecting the desired operation.

2. Description of the Prior Art

My own U.S. patents are typical of the type of structures and pack units normally employed in commercial automotive car washing establishments, and the numbers and issue dates of those patents are as follows: U.S. Pat. Nos. 3,455,068, July 15, 1969; 3,535,833, Oct. 27, 1970; 3,621,622, Nov. 23, 1971; 3,626,646, Dec. 14, 1971; 3,685,217, Aug. 22, 1972; 3,768,214, Oct. 30, 1973; 3,772,833, Nov. 20, 1973; 3,798,847, Mar. 26, 1974; 3,800,481, Apr. 2, 1974; 3,807,099, Apr. 30, 1974; 3,813,829, June 4, 1974; 3,820,291, June 28, 1974; 3,842,547, Oct. 22, 1974; 3,914,908, Oct. 28, 1975; and Re. 28,118, Aug. 20, 1974. Additionally, the following patent applications are also of interest in teaching various apparatuses used in commercial automotive car washing establishments: Application Ser. No. 684,440, filed May 7, 1976; Ser. No. 680,838, filed Apr. 28, 1976; and Ser. No. 685,015, filed May 10, 1976. The aforementioned patents and patent applications, incorporated herein by reference, teach various apparatuses used in commercial car washing establishments and disclose pack units, pack unit mounting means, and racks therefore.

Generally, the car washing apparatus of the prior art has employed some type of rotary finishing wheel or brush to perform the washing operation and some type of stationary curtain or blow-dry fan means for drying the motor vehicle after washing and rinsing is complete. The brushes often are unable to reach all parts of the motor vehicle and frequently result in scratches or in otherwise marring the surface of the vehicle. The prior art drying curtains are relatively inefficient, do not reach all portions of the motor vehicle, and usually result in a less than completely dried motor vehicle as it exits the car wash establishment.

The improved apparatus of the present invention employs a relatively inexpensive, easy to operate and maintain apparatus which avoids all of the problems of the prior art and provides a far more efficient washing and drying operation.

SUMMARY OF THE INVENTION

The present invention provides an apparatus for automatically washing, drying, buffing, polishing, or otherwise finishing a motor vehicle which is transported therethrough. The apparatus includes a frame and a generally horizontal support carried by the frame. A rack means is provided for carrying at least one pack unit of finishing material for operatively engaging the motor vehicle. An arm means has a first portion pivotally connected to the generally horizontal support and a second portion coupled to the rack means for supportively carrying it. The apparatus includes a means operatively coupled to the arm means for at least partially rotating the arm means in an arc about the first pivotally connected portion to rockably move the rack means in a generally horizontal plane to facilitate the washing, drying, buffing, polishing or otherwise finishing of the motor vehicle.

In the preferred embodiment of the present invention, the rack means includes a first generally rectangular rack having its longitudinal dimension parallel to the first horizontal support and adapted to carry a plurality of pack units and a second generally rectangular rack having longitudinal dimension parallel to the first horizontal support and being adapted to carry a plurality of pack units. The first and second generally rectangular racks are disposed on opposite sides of the horizontal support and each is pivotally connected to and carried by opposite end portions of the arm means.

In the preferred embodiment, the means for at least partially rotating the arm means includes a drive element, means for rotatively driving the element, and an elongated linkage member having one end pivotally connected to an end portion of the drive element and the opposite end pivotally connected to a portion of the arm means. The rotation of the drive element causes the linkage member to reciprocally drive the first and second racks in opposite directions such that each defines a generally arcuate horizontal path of motion for each of the racks. This motion causes the pack units of finishing material to travel in a generally arcuate path thereby causing portions of the pack units to operatively engage nearly all exposed portions of the motor vehicle for more efficiently washing, drying, buffing, polishing or otherwise finishing same.

In the preferred embodiment, the apparatus finds particular use in washing and drying the motor vehicles and the frame may be provided with a fluid conduit for spraying liquid generally toward the motor vehicle as it is transported through the frame such that the combination of the sprayed liquid and the generally arcuate motion of the pack units results in a highly efficient washing operation without any chance of scratching or marring the finish on the motor vehicle.

The motion of the pack units effected by the apparatus of the present invention results in a much more efficient washing and/or drying operation and allows the operation to be accomplished in a lesser period of time. The use of the motion in combination with flap-like pack units of the curtain-type employing generally soft flexible material eliminates the needs for utilizing rotary brushes thereby greatly reducing or eliminating the possibility of scratching or marring the finish of the vehicle. The modular flap-like pack units of finishing material may be easily and quickly installed, removed and replaced as they become soiled, saturated or the like.

Other advantages and meritorious features of the present invention will be more fully understood from the following detailed description of the drawings and the preferred embodiment, the appended claims and the drawings which are described briefly hereinbelow.

BRIEF DESCRIPTION OF THE DRAWINGS

FIG. 1 is a front view of a car-washing embodiment of the apparatus of the present invention;

FIG. 2 is a top plan view of the apparatus of FIG. 1;

DESCRIPTION OF THE PREFERRED EMBODIMENT

Figure 4:
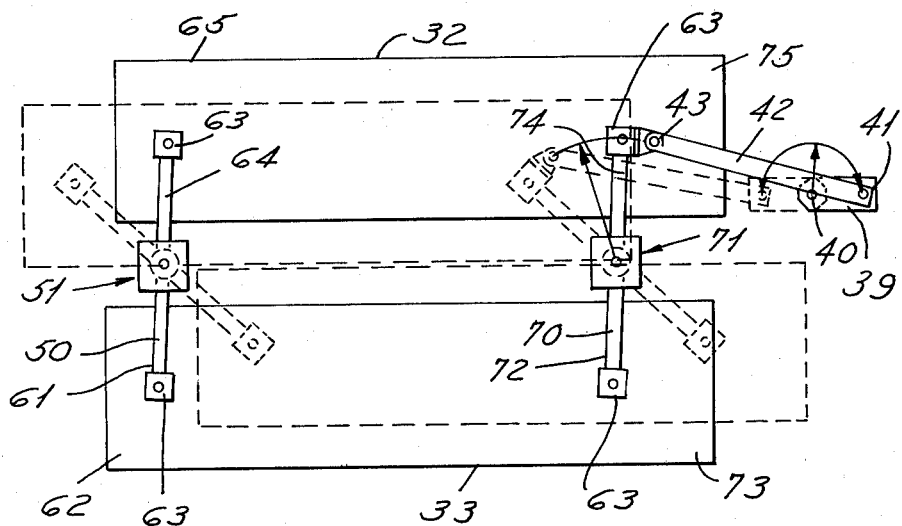
FIG. 4 is a fragmentary top view of the rack plates, support arms and drive means of the present invention showing a second position of the rack plates in phantom lines to illustrate the motion thereof.

FIGS. 1 and 2 illustrate a wash rack embodiment of the apparatus of the present invention. A drying rack embodiment would be virtually identical but would not require the spray conduits and could employ a different style of pack unit. The apparatus for automatically washing, drying, buffing, polishing, or otherwise finishing a motor vehicle as it is transported therethrough includes a frame 11 having an entrance 12, an exit 13, and an intermediate portion 14 which is spaced vertically above the motor vehicle as it passes into the entrance 12, under and through the intermediate portion 14, and out the exit 13.

A first side portion 15 of the frame 11 includes a first pair of generally vertical legs 16, 17, each having a base or foot portion 18 at the lower end thereof for supportively positioning the frame 11 on a horizontal surface. A generally horizontal upper cross support member 19 extends between the upper portions of the legs 16, 17 and is disposed generally parallel to the direction in which the motor vehicle passes through the frame 11. A lower cross support member 20 extends between the lower portions of the legs 16, 17 for further strengthening and supporting the frame 11.

The opposite side portion 21 of the frame 11 includes a second pair of generally vertical legs 22, 23 each having a base or foot portion 24 at the lower end thereof for supportively positioning the frame 11 on a generally horizontal surface. A generally horizontal upper cross support member or cross member 25 is connected between the upper end portions of the legs 22, 23 for strengthening the frame 11 and a lower cross support member 26 extends between the lower portions of the legs 22, 23 for even further reinforcing the frame 11.

The upper end portions of the front legs 16 and 22 are supportively interconnected by a horizontal support member 27 which is disposed generally perpendicular to the direction of movement of the motor vehicle through the frame 11 and which defines the entrance 12 to the frame 11. A similar horizontal support member 28 extends between the upper end portions of the rear legs 17 and 23 to supportively strengthen the frame 11 and define the exit 13.

The intermediate portion 14 of the frame 11 includes a third generally horizontal support member 29 which has one end supportively carried by the cross member 19 on one side 15 of the frame 11 and its opposite end supportively carried by the cross member 25 on the other side 21 of the frame 11. The horizontal support member 29 is generally perpendicular to the direction in which the motor vehicle moves through the frame 11 and is parallel to the horizontal support members 27 and 28.

A pair of arm assemblies 30 and 31 are supportively carried by the horizontal support member 29. The arm assemblies 30, 31 carry first and second rack plates 32, 33. Each of the rack plates 32, 33 is a generally rectangular plate having its longitudinal axis generally parallel to the longitudinal axis of the horizontal supports 27, 28 and 29. Furthermore, each of the rack plates 32, 33 has suspended therefrom one or more pack units of finishing material 34 which frictionally engage the motor vehicle as it passes through the frame 11 for more effectively washing, drying, buffing, pollishing, or otherwise finishing the vehicle.

A drive assembly 35 is used to actuate the arm assembly 31 and cause the rack plates 32, 33 to move in a generally arcuate path back and forth in a horizontal plane to facilitate the operation being performed on the motor vehicle.

The frame 11 of FIG. 1 is provided with a conduit 36 having a plurality of spray nozzles or apertures 36 therein for directing a spray of liquid such as water or a suitable cleaning agent toward the motor vehicle as it passes through the intermediate portion 14 of the frame 11 for washing applications. the source of the liquid is not shown and any conventional source of liquid or cleaning solution will suffice.

The drive assembly 35 includes a conventional motor 37 having a conventional gear box 38 for achieving suitable drive speeds. The motor 37 and gear box 38 may be secured to the frame 11, for example to the cross bar 25 by any suitable fastening means such as nuts and bolts or the like, not shown, but conventionally known. The operation of the motor 37 causes a rotatable element 39 to rotate in a generally circular path in a horizontal plane. The drive element 39 has one end portion secured to a drive axle 40 for positively rotating the element 39 and its opposite end portion pivotally connected to one end 41 of a linkage member 42. The opposite end 43 of the linkage member 42 is pivotally connected to the arm assembly 31 as hereinafter described with reference to FIG. 4.

The arm assemblies 30 and 31 will now be described in more detail with reference to FIGS. 3 and 4. The arm assembly 30 of FIG. 3 includes an elongated arm member 50 having its central portion 51 pivotally mounted on and carried by one end portion 46 of the central support member 29 by a bearing assembly 52. The bearing assembly 52 includes a vertically upright shaft 53 passing through the horizontal support 29 and the central portion 51 of the arm 50. The shaft 53 passes through an upper bearing plate 54 above the support 29 and a lower bearing plate 55 immediately below the support 29. An end plate assembly 56 retainably secures the shaft 53 in position and prevents it from falling out of the support 29 as conventionally known. A bearing collar 57 supports the central portion 51 of the arm 50 and another bearing plate 58 is disposed between the plate 54 and the bearing collar 57. The upper end portion 59 of the shaft arm 50 pivotally mounts the arm 50 supportively upon the support member 29.

A first end portion 61 of the arm 50 pivotally supports a first end portion 62 of the rack plate 33 via bearing assembly 63 while the opposite end portion 64 of the elongated arm member 50 pivotally supports a first end portion 65 of the rack plate 32. Similarly, a second arm assembly 31 has a generally elongated arm member 70 whose central portion is pivotally mounted on and carried by the opposite end portion 47 of the support member 29 by a bearing assembly 71 which is identical to the bearing assembly 52 of FIG. 3. One end 72 of the arm of 70 pivotally carries the opposite end portion 73 of the rack plate 33 while the opposite end portion 74 of the elongated arm 70 pivotally supports the opposite end portion 75 of the rack plate 32. All of the rack support bearing assemblies 63 used to pivotally support the rack plates 32, 33 from the arm members 50, 70 are similar to the assembly 63 of FIG. 3.

Figure 3:
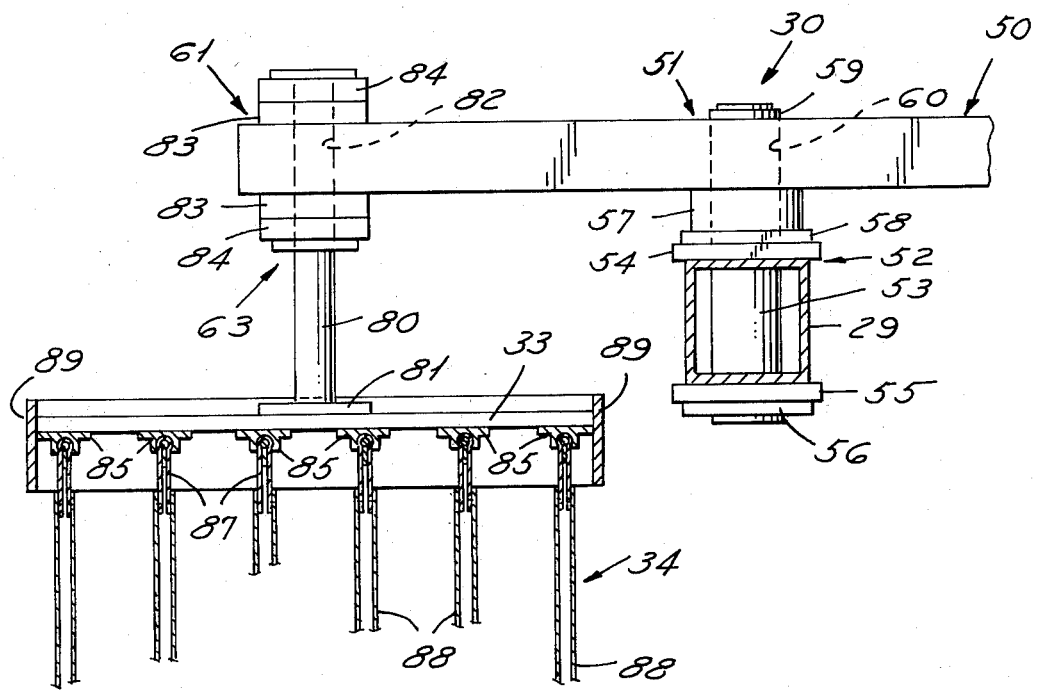
FIG. 3 is a blown-up fragmentary view of the arm means of the present invention as it is pivotally mounted to the horizontal support and as it pivotally supports a rack plate from one end portion thereof.

As shown in FIG. 3, the rack support assembly 63 includes a vertically disposed shaft 80 whose lower end portion terminates in a plate 81. The plate 81 is rigidly secured to one end portion 62 of the rack plate 33 by any suitable fastening means such as nuts and bolts or the like, not shown but conventionally known. The upper end of the shaft 80 is journaled through a bearing channel 82 in the outer end portion 61 of the arm 50 and secured therein by bearing plates 83 and end plates 84 which insure that the shaft 80 is free to rotate within the channel 82 while being carried by the outer end portion of the arm 61.

The rack plates 32 and 33 are provided with a plurality of longitudinally aligned slot-defining structures 85 each of which is adapted to removeably mount a pack unit of finishing material 34 as described in greater detail in my copending patent application, Ser. No. 680,838 filed on Apr. 28, 1976 which is incorporated by reference herein. As described therein, each of the pack units 34 include a material-covered bulbous head portion 86 adapted to be slideably received within a slot-defining formation 85 so as to suspend a neck portion 87 therefrom. Attached to the neck portion 87 are one or more flap-like units or members 88 of finishing material adapted to engage the exposed surfaces of a motor vehicle for performing a finishing-type operation thereon. The pack units 34 are adapted to have the bulbous head portions 86 telescopically received within the slot-defining channels 85 so as to mount the pack units 34 for limited hinge-type pivotal rotation about the slot axes. Additionally, the rack plates 32 and 33 may be provided with end plates 89 if desired.

As shown in FIG. 4, as the rotating element 39 is positively driven by the motor 37, the linkage element 42 will cause the rack plates 32 and 33 to move in a generally arcuate back and force motion in the horizontal plane of the rack plates 32, 33 since one end 41 of the linkage member 42 is pivotally connected to the rotating element 39 while the opposite end 43 is pivotally connected to the arm 70 at a point spaced from the central portion at which the arm 70 is pivotally mounted on the support 29 by the bearing assembly 71. The phantom lines show the arms 50, 70 and the rack plates 32, 33 in a second position to illustrate the nature of the elliptical, arcuate or oval path traced by the plates 32, 33 as the element 39 is rotated.

In operation, the motor vehicle is transported into the entrance 12 of the frame 11 and under the intermediate portion 14. The motor 37 causes the element 39 to rotate and the rotation of the element 39 is transmitted via linkage member 42 to the arm assemblies 30 and 31. The arm 50 is pivotally mounted to one end portion 46 of the support 29 via the bearing assembly 52 while the central portion of the arm 70 is pivotally mounted to the opposite end portion 47 of the support 29 via the bearing assembly 71. The opposite end portions of the arms 50 and 70 pivotally support and suspend a pair of rack plates 32, 33 on either side of the support member 29. The motion of the rotating element 39 causes the arm 70 to be rocked back and forth about its central pivotally mounted portion thereby effecting a generally arcuate back and forth path of motion of the rack plates 32 and 33 about their horizontal plane. The nature of this motion increases the efficiency of the operation being performed on the motor vehicle within the intermediate portion 14 without the need to resort to brushes or pack units of finishing material which might scratch or otherwise mar the finished surface of the motor vehicle. When the motor vehicle emerges from the exit 13 of the frame 11, the washing, drying, buffing, polishing or other finishing operation which was performed thereon has been completed to a degree heretofore unachievable in the prior art.

With this detailed description of the specific apparatus used to illustrate the prime embodiment of the present invention and the operation thereof, it will be obvious to those skilled in the art that various modifications can be made in the structure, materials and usages recited herein without departing from the spirit and scope of the present invention which is limited only by the appended claims.

I claim:

1. Apparatus for automatically washing, drying, buffing, polishing, or otherwise finishing a motor vehicle which is transported therethrough comprising:
   a frame;
   a first generally horizontal support carried by said frame;
   rack means for carrying a plurallity of pack units of finishing material for operatively engaging said motor vehicle;
   said rack means including a first generally rectangular rack having its longitudinal dimension parallel to said horizontal support, said first rack being adapted to carry a plurality of said pack units; and a second generally rectangular rack having its longitudinal dimension parallel to said horizontal support, said second rack being adapted to carry a plurality of said pack units; said first and second racks being disposed on opposite sides of said horizontal support such that both of said racks will serially engage said motor vehicle as it is transported through said frame;
   arm means supportively carrying said rack means, said arm means including a first portion pivotally connected to said support and a second portion coupled to said rack means; and
   drive means carried by said frame operatively coupled to said arm means for at least partially rotating said arm means in an arc about said first pivotally connected portion to rockably move said rack means in a generally horizontal plane to facilitate the washing, drying, buffing, polishing or otherwise finishing of said motor vehicle.

2. The apparatus of claim 1 wherein said drive means for at least partially rotating said arm means includes a drive element and means for rotating said drive element, and a linkage member having one end pivotally connected to said drive element and its opposite end pivotally connected to said arm means adjacent said second portion thereof such that the rotation of said drive element effects a generally reciprocating movement of said first and second racks about an oval path in a generally horizontal plane.

3. The apparatus of claim 1 wherein said arm means includes an elongated member having one end portion pivotally connected to said first rack for supporting same, a second end portion pivotally connected to said second rack for supporting same, and a central portion pivotally connected to said horizontal support and carried thereby, the rotation of said elongated member in an arc by said drive means about said central portion resulting in said first and second plates being reciprocated in opposite directions back and forth in a generally arcuate path.

4. The apparatus of claim 1 wherein said arm means includes a pair of arms carried by said first horizontal support adjacent the opposite ends thereof, the central portion of each of said arms being pivotally connected to and carried by said horizontal support, means adjacent the ends of said pair of arms for supportively carrying said first rack and means adjacent the opposite ends of said pair of arms for supportively carrying said second rack, said drive means including a rotatable element and a linkage member, said linkage member having one end pivotally connected to said rotatable element and its opposite end pivotally connected to one of the arms at a point spaced from the central portion thereof for moving said first and second racks back and forth in a generally arcuate path in said horizontal plane.

5. Apparatus for automatically washing, drying, buffing, polishing, or otherwise finishing a motor vehicle which is transported therethrough comprising: a frame; a first generally horizontal support carried by said frame; said frame including a first pair of generally vertical leg means; a second generally horizontal support interconnecting said first pair of leg means; a second pair of generally vertical leg means disposed opposite said first pair of leg means; and a third generally horizontal support interconnecting said second pair of leg means, said third support being substantially parallel to said second support and parallel to the direction in which said motor vehicle is transported through said apparatus; and wherein said first generally horizontal support is generally perpendicular to said second and third supports and is carried thereby, one end portion of said first support being carried by a central portion of said second support and the opposite end portion of said first support being carried by a central portion of said third support; rack means for carrying pack units of finishing material for operatively engaging said motor vehicle; arm means supportively carrying said rack means, said arm means including a first portion pivotally connected to said support and a second portion coupled to said rack means; means operatively coupled to said arm means for at least partially rotating said arm means in an arc about said first pivotally connected portion to rockably move said rack means in a generally horizontal plane to facilitate the washing, drying, buffing, polishing or otherwise finishing of said motor vehicle; said rack means including a first generally rectangular rack having its longitudinal dimension parallel to said first horizontal support, said first rack being adapted to carry a plurality of said pack units; and a second generally rectangular rack having its longitudnal dimension parallel to said first horizontal support, said second rack being adapted to carry a plurality of said pack units; said first and second racks being disposed on opposite sides of said first horizontal support such that both of said racks will serially engage said motor vehicle as it is transported through said frame.

6. The apparatus of claim 5, wherein said arm means includes a first elongated bar having its central portion pivotally connected to and carried by said first horizontal support adjacent a first end portion thereof and a second elongated bar having its central portion pivotally connected to and carried by said first horizontal support adjacent the opposite end portion thereof, a first end of said first and second bars being pivotally connected to opposite end portions of said first rack for supportively carrying same and the opposite ends of said first and second bars being pivotally connected to opposite end portions of said second rack for supportively carrying same such that as one of said first and second elongated arms is caused to pivot about its pivotally connected central portion, the first rack is caused to move in a first lateral direction while the second rack moves in the opposite lateral direction.

7. The apparatus of claim 6 wherein said means for rotating said arm means is carried by said frame and includes a drive element; means for rotatively driving said element; and an elongated linkage member having one end pivotally connected to an end portion of said drive element and the opposite end pivotally connected to a portion of one of said elongated bars spaced from the pivotally connected central portion thereof such that the rotation of said drive element causes said linkage member to reciprocally drive said first and second racks in opposite directions to define a generally horizontal arcuate path of motion for each.

8. The apparatus of claim 7 wherein said pack units of finishing material include material for performing a drying operation on said motor vehicle.

9. The apparatus of claim 7 wherein said frame further includes conduit means carried by said frame for spraying a liquid generally toward said motor vehicle as it is transported through said frame and wherein said pack units of finishing material include material for performing a washing operation on said vehicle.

10. Apparatus for automatically washing, drying, buffing, polishing, or otherwise finishing a motor vehicle which is transported therethrough comprising: a frame; a generally horizontal support carried by said frame; rack means for carrying a plurality of pack units of finishing material for operatively engaging said motor vehicle; arm means supportively carrying said rack means, said arm means including a first portion pivotally connected to said support and a second portion coupled to said rack means; and means operatively coupled to said arm means for at least partially rotating said arm means in an arc about said first pivotally connected portion to rockably move said rack means in a generally horizontal plane to facilitate the washing, drying, buffing, polishing or otherwise finishing of said motor vehicle; said rack means including a first and second elongated rack plate having its longitudinal axis disposed generally parallel to said horizontal support, each of said rack plates including a plurality of pack unit mounts for suspending a plurality of pack units therefrom, said first and second rack plates being disposed on opposite sides of said horizontal support; said arm means including an elongated member having one end portion pivotally connected to said first rack plate for supporing same, a second end portion pivotally connected to said second rack plate for supporting same, and a central portion pivotally connected to said horizontal support and carried thereby such that the partial rotation of said elongated member in an arc about said pivotally connected central portion causes said first and second rack plates to reciprocate generally back and forth in opposite directions.

11. The apparatus of claim 10 wherein said means for at least partially rotating said arm means includes a first linkage element, drive means for rotating said first linkage element, and a second linkage element having one end pivotally connected to said first linkage element and its opposite end pivotally connected to one of said end portions of said elongated member for imparting said generally reciprocable motion to said first and second rack plates so that each rotates in a generally oval path in a substantially horizontal plane to increase the effectiveness of washing, drying, buffing, polishing or otherwise finishing said motor vehicle.

12. The apparatus of claim 11 further including means carried by said frame for directing a washing liquid toward said motor vehicle and wherein said pack units include finishing material for washing said motor vehicle as it is transported under said rack means.

13. The apparatus of claim 11 wherein said arm means further includes a second elongated member having one end portion pivotally connected to said first rack plate for supporting same and its opposite end portion pivotally connected to said second rack plate for supporting same and a central portion pivotally connected to said horizontal support and carried thereby, the first end portion of said first and second elongated members being connected to opposite end portions of said first elongated rack plate and the opposite end portions of said first and second elongated members being connected to opposite end portions of said second elongated rack plate.

14. Apparatus for performing a processing operation such as washing, drying, buffing, polishing or otherwise finishing a motor vehicle comprising:
    a frame including an entrance, an exit, and an intermediate portion having a pair of opposing sides, said frame being oriented such that a motor vehicle to be processed may be transported through said entrance, processed while said motor vehicle is being transported between said opposing sides and under said intermediate portion, and then transported out of said exit after said processing operation is complete;
    a first support member extending substantially across the intermediate portion of said frame between said pair of opposing sides;
    a pair of arm means carried by said first support member adjacent the opposite ends thereof, the central portion of each of said pair of arm means being pivotally connected to and carried by said first support member;
    first and second elongated rack means generally disposed transversely of said frame entrance and exit, said rack means being disposed on opposite sides of said first support member;
    pack means supportively carried by said rack means for operatively engaging said motor vehicle as it is transported through said intermediate portion to perform said processing operation thereon;
    means adjacent the ends of said pair of arm means which are disposed generally toward said entrance for supportively carrying said first elongated rack means and means adjacent the opposite ends of said pair of arm means which are disposed generally toward said exit for supportively carrying said second elongated rack means;
    a rotatable element;
    drive means carried by said frame for drivably rotating said element; and
    linkage means having one end pivotally coupled to said rotatable element and its opposite end pivotally coupled to a portion of one of said pair of arm means at a point spaced from the central portion thereof for reciprocally rocking said first and second rack means back and forth in a generally arcuate path in horizontal plane to facilitate said processing operation.

* * * * *